United States Patent
Ko et al.

(10) Patent No.: US 7,715,594 B2
(45) Date of Patent: May 11, 2010

(54) METHOD OF IRIS RECOGNITION USING CUMULATIVE-SUM-BASED CHANGE POINT ANALYSIS AND APPARATUS USING THE SAME

(75) Inventors: Jong Gook Ko, Daejeon (KR); Youn Hee Gil, Daejeon (KR); Jang Hee Yoo, Daejeon (KR); Kyo Il Chung, Daejeon (KR)

(73) Assignee: Electronics and Telecommunications Research Intitute, Daejeon (KR)

( * ) Notice: Subject to any disclaimer, the term of this patent is extended or adjusted under 35 U.S.C. 154(b) by 1044 days.

(21) Appl. No.: 11/406,192

(22) Filed: Apr. 18, 2006

(65) Prior Publication Data

US 2007/0014438 A1     Jan. 18, 2007

(30) Foreign Application Priority Data

Dec. 7, 2005   (KR) .................. 10-2005-0118628

(51) Int. Cl.
   *G06K 9/00*   (2006.01)
(52) U.S. Cl. .................. 382/117; 382/115; 382/181; 382/190; 382/195; 382/276; 382/282; 382/286
(58) Field of Classification Search .................. 382/115, 382/117, 181, 190, 195, 276, 282, 286
   See application file for complete search history.

(56) References Cited

U.S. PATENT DOCUMENTS 5,291,560 A    3/1994   Daugman

2004/0252866 A1*  12/2004  Tisse et al. .................. 382/117
2005/0008201 A1    1/2005  Lee et al.

FOREIGN PATENT DOCUMENTS

| JP | 2000-189403 A | 7/2000 |
|---|---|---|
| JP | 2002-259981 A | 9/2002 |
| JP | 2002-269564 | 9/2002 |
| KR | 1020020065248 | 8/2002 |
| KR | 1020030048747 | 6/2003 |
| KR | 1020030066512 | 8/2003 |

OTHER PUBLICATIONS

Ma et al., "Personal Identification Based on Iris Texture Analysis", Dec. 2003, IEEE Transactions of Pattern Analysis and Machine Intelligence, vol. 25, No. 12, pp. 1519-1533.*

* cited by examiner

*Primary Examiner*—Vikkram Bali
*Assistant Examiner*—Daniel Zeilberger
(74) *Attorney, Agent, or Firm*—Ladas & Parry LLP

(57) ABSTRACT

A method of iris recognition using a cumulative-sum-based change point analysis and an apparatus using the same are disclosed. The method includes: transforming an iris image to a polar coordinated image having n×m pixel size and dividing the polar coordinated image into at least one cell; grouping the divided iris images into at least one of first groups having a predetermined number of cells, and at least one of second groups each having more cells than the first group has; performing a cumulative-sum-based change point analysis using a predetermined characteristic pattern value of each cell as a representative value; and generating a pattern vector by assigning a predetermined value to a cell having the change point and assigning a different value to other cells.

20 Claims, 7 Drawing Sheets

FIG. 1A

|      | Jan  | Feb  | Mar  | Apr  | May  | Jun  | Jul  | Aug  | Sep  | Oct  | Nov  | Dec  |
|------|------|------|------|------|------|------|------|------|------|------|------|------|
| 1987 | 10.7 | 13.0 | 11.4 | 11.5 | 12.5 | 14.1 | 14.8 | 14.1 | 12.6 | 16.0 | 11.7 | 10.6 |
| 1988 | 10.0 | 11.4 | 7.9  | 9.5  | 8.0  | 11.8 | 10.5 | 11.2 | 9.2  | 10.1 | 10.4 | 10.5 |

FIG. 1B

START

CALCULATE AVERAGE VALUE; $\overline{X} = \dfrac{x_1 + x_2 + \ldots + x_{24}}{24}$ — S120

CALCULATE CUMULATIVE SUM FROM 0; $S_0 = 0$ — S130

CALCULATE OTHER CUMULATIVE SUM BY ADDING DIFFERENCE BETWEEN AVERAGE OF PREVIOUS SUM AND CURRENT VALUE
; $s_i = s_{i-1} + (x_i - \overline{X})$, for
i = 1, 2, ... , 24
— S140

END

FIG. 1C $\bar{X} = 11.39583$
$S_0 = 0$
$S_1 = S_0 + (X_1 - \bar{X}) = 0 + 10.7 - 11.39583 = -0.69583$
$S_2 = S_1 + (X_2 - \bar{X}) = -0.69583 + 13.0 - 11.39583 = 0.908333$
$\vdots$
$S_{24} = S_{23} + (X_{24} - \bar{X}) = 0.89583 + 10.5 - 11.39583 = 0.0$

METHOD OF IRIS RECOGNITION USING CUMULATIVE-SUM-BASED CHANGE POINT ANALYSIS AND APPARATUS USING THE SAME

CROSS-REFERENCE TO RELATED PATENT APPLICATION

This application claims the benefit of Korean Patent Application No. 10-2005-0118628, filed on Dec. 7, 2005, in the Korean Intellectual Property Office, the disclosure of which is incorporated herein in its entirety by reference.

BACKGROUND OF THE INVENTION

1. Field of the Invention

The present invention relates to a method of iris recognition to identify an authorized user and an apparatus using the same, and more particularly, to a method of iris recognition to identify an authorized user through simply and effectively extracting characteristics of iris using a cumulative-sum-based change point analysis (CPA) with less amount of calculation.

2. Description of the Related Art

Many methods of extracting characteristic patterns from iris were introduced. Among them, a Garbor transform and a wavelet method are widely known technologies to analyze the characteristic patterns of iris. Daugman introduced a conventional method of extracting characteristic patterns from iris using the Garbor transform and creating a pattern vector. Such a Daugman's method requires high quality iris image. Therefore, Daugman's method requires very expensive image processing equipment. Also, the computation complexity thereof is very high due to the calculations related to exponential functions and numerous multiplications. Furthermore, the obtained iris image is transformed into a polar coordinated image and the characteristic patterns are extracted from the polar coordinated image. In this procedure, some differences are generated between the obtained iris image and the polar coordinated image due to the position of iris is shifted. Therefore, the performance of iris recognition obtained through extracting and matching iris patterns is degraded.

SUMMARY OF THE INVENTION

The present invention provides a method of iris recognition to identify an authorized user through extracting characteristic patterns from iris using a cumulative-sum-based change point analysis (CPA), which is simple and effective while requiring less amount of computation compared to a conventional method.

According to an aspect of the present invention, there is provided a method of iris recognition using cumulative sum based change analysis including: transforming an iris image to a polar coordinated image having n×m pixel size and dividing the polar coordinated image into at least one cell; grouping the divided iris images into at least one of first groups having a predetermined number of cells, and at least one of second groups each having more cells than the first group has; performing a cumulative-sum-based change point analysis using a predetermined characteristic pattern value of each cell as a representative value; and generating a pattern vector by assigning a predetermined value to a cell being the change point and assigning a different value to other cells.

According to another aspect of the present invention, there is provided an apparatus for iris recognition using a cumulative-sum-based change point analysis including: a dividing unit for transforming an iris image to a polar coordinated image having n×m pixel size and dividing the polar coordinated image into at least one cell; a grouping unit for grouping the divided iris images into at least one of first groups having a predetermined number of cells, and at least one of second groups each having more cells than the first group has; a pattern vector generating unit for generating a pattern vector by assigning a predetermined value to a cell being the change point and assigning a different value to other cells after performing a cumulative-sum-based change point analysis using a predetermined characteristic pattern value of each cell as a representative-value; and an authentication unit for performing an authentication process by receiving the pattern vector generated from the pattern vector generating unit and a previously registered pattern vector.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
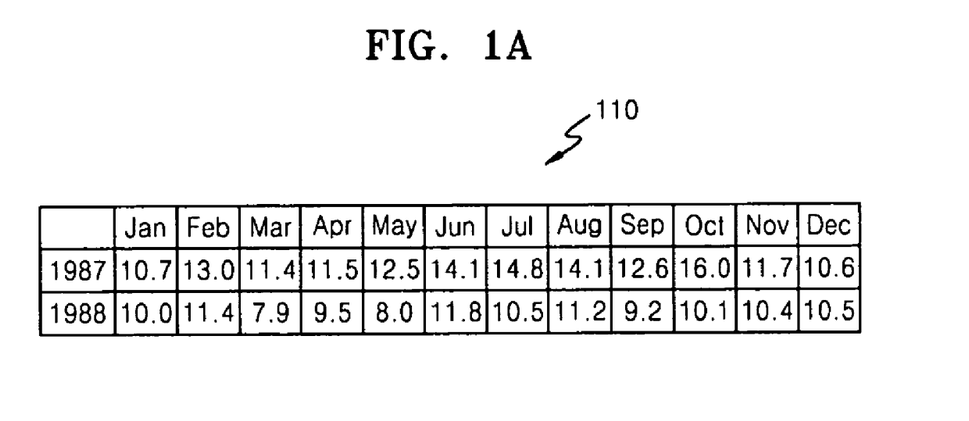
FIG. 1A shows sample data for the cumulative sum based CPA.
Figure 1B:
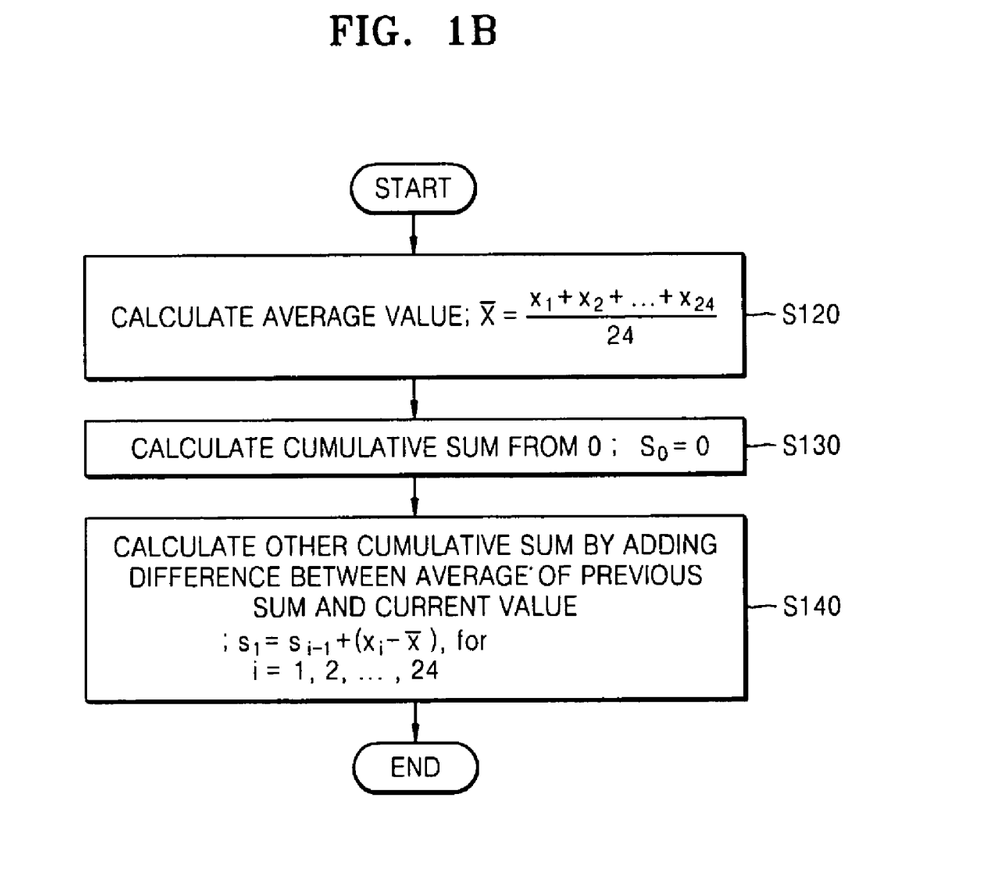
FIG. 1B is a flowchart of the cumulative sum based CPA.
Figure 1C:
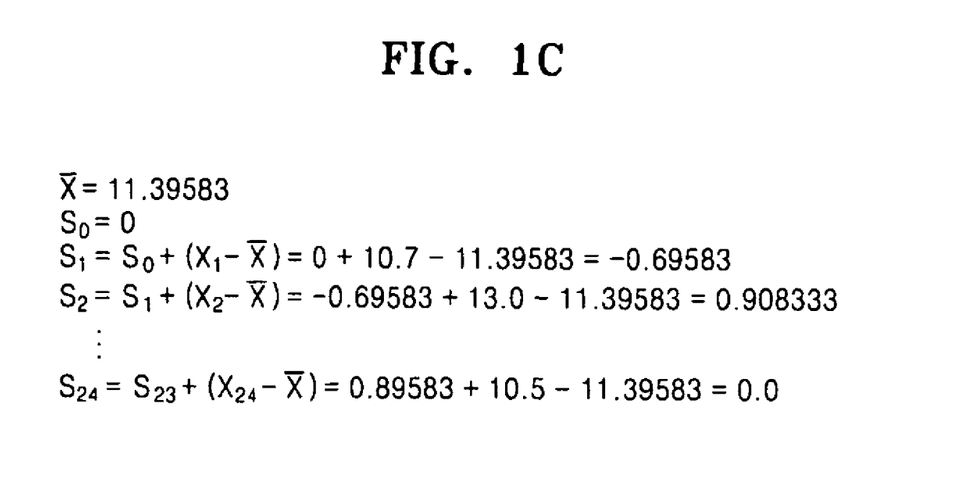
FIG. 1C shows equations of calculating an accumulative sum for the cumulative sum based CPA of FIG. 1B using sample data shown in FIG. 1A.
Figure 1D:
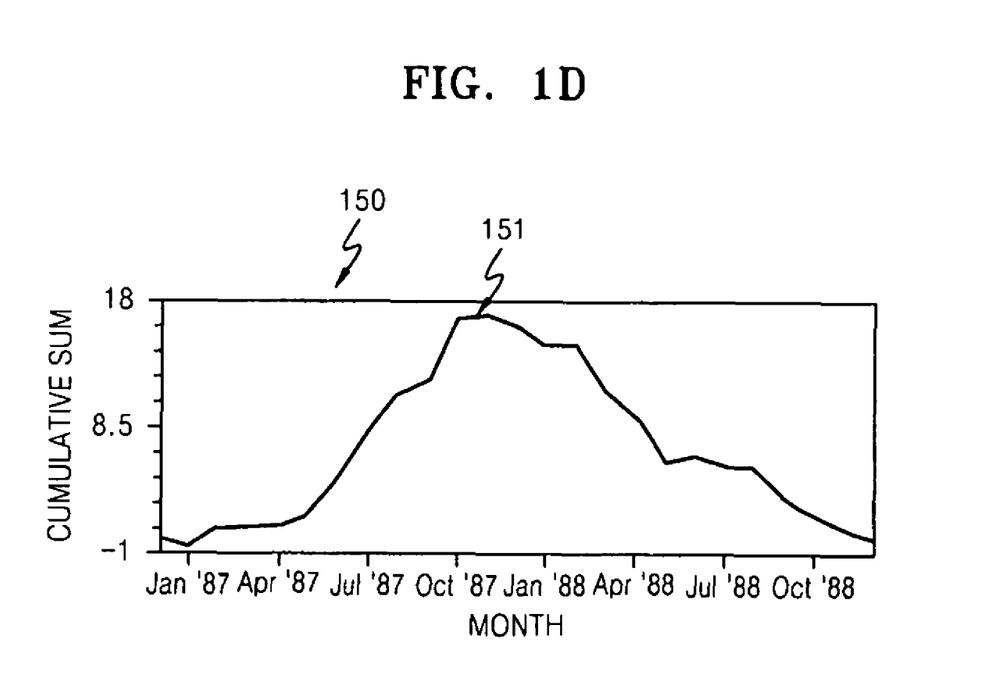
FIG. 1D is a graph showing the result of the equations shown in FIG. 1C.

Hereinafter, a cumulative-sum-based change point analysis (CPA) will be described with reference to FIGS. 1A and 1D at first. FIG. 1A shows sample data for the cumulative sum based CPA, and FIG. 1B is a flowchart of the cumulative sum based CPA. FIG. 1C shows equations of calculating a cumulative sum for the cumulative sum based CPA of FIG. 1B using sample data shown in FIG. 1A, and FIG. 1D is a graph showing the result of the equations shown in FIG. 1C. FIG. 1A shows trade deficits 110 of each month in 1987 and 1988 as sample data to describe the cumulative sum based CPA. That is, the cumulative sum based CPA finds a region having a sharpest change point among arranged sample data. Now, a method of calculating a cumulative sum with each input data will be described. At first, an average value ($\bar{X}$) of input data is calculated in operation S120. Based on the calculated average value, a difference between a current input data and the average value ($\overline{X}$) is calculated. The cumulative sum based CPA is not a method of calculating a difference between input data. It calculates difference between the input data and the average value. Therefore, a variation ratio of input data can be observed throughout the entire input data. In order to calculate the difference between the average and the input data, a cumulative sum at 0 ($S_0=0$) is calculated, and then other cumulative sums ($S_i$) are calculated by adding a current value to difference between the current value and the average of previous cumulative sum. In the present example, i is 1 to 24. FIG. 1C shows cumulative sums calculated by applying sample data shown in FIG. 1A. The graph shown in FIG. 1D is created based on the cumulative sums shown in FIG. 1C. As shown in the graph 150 in FIG. 1D, a numeral reference 151 denotes a sharpest change point of input data. That is, the change point 151 of the November 1987 is a sharpest charge point among input data. The left side curve of the change point 151 has an upward slope. That is, the input values are generally larger than the average value in the left side curve of the change point 151. The right side curve of the change point 151 has a downward slope. That is, the input values are generally smaller than the average value in the right side curve of the change point 151. And, the cumulative sums begin from 0 and end at 0.

Figure 2:
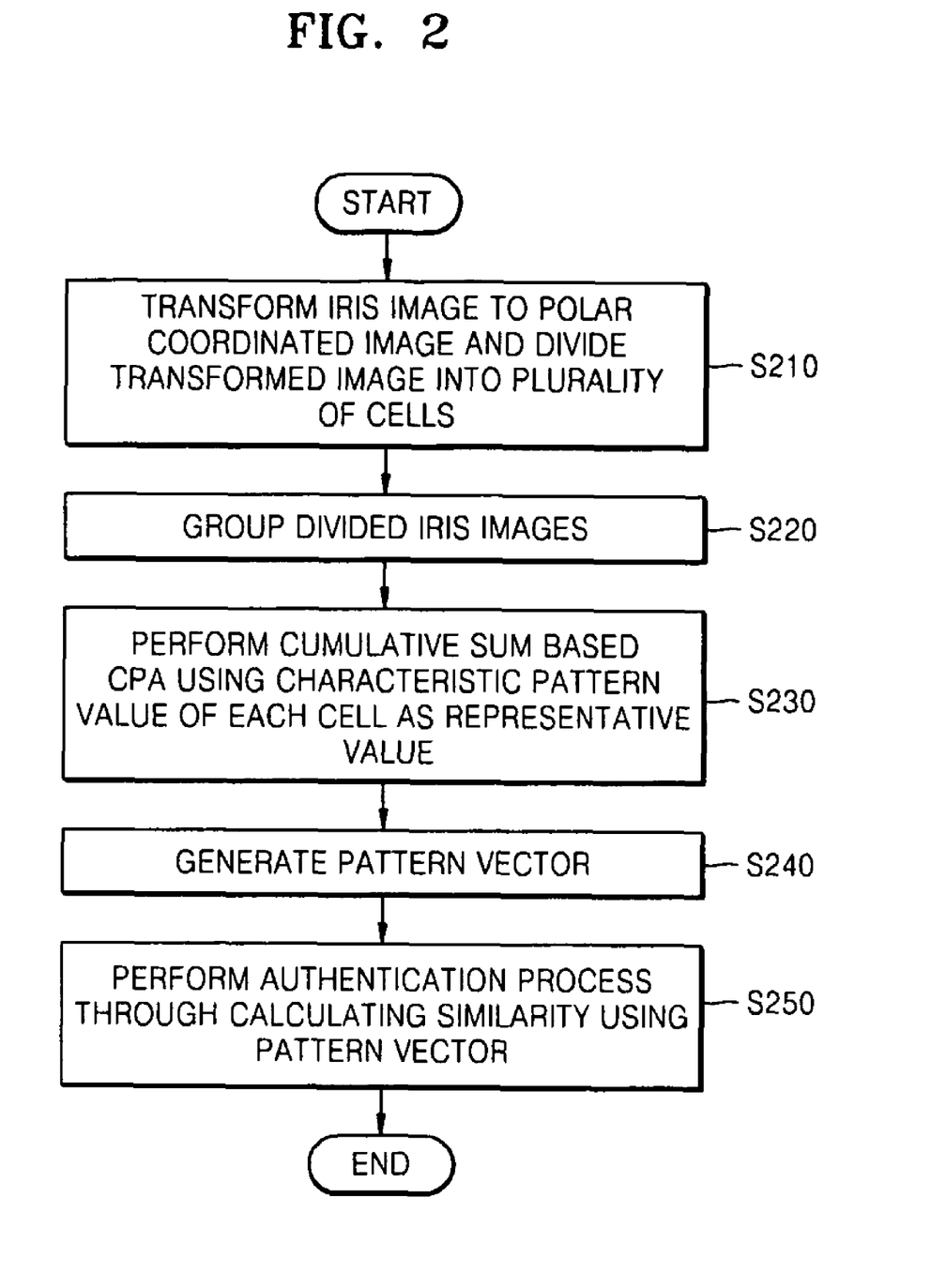
FIG. 2 is a flowchart of a method of iris recognition using a cumulative sum based CPA according to an embodiment of the present invention.
Figure 3:
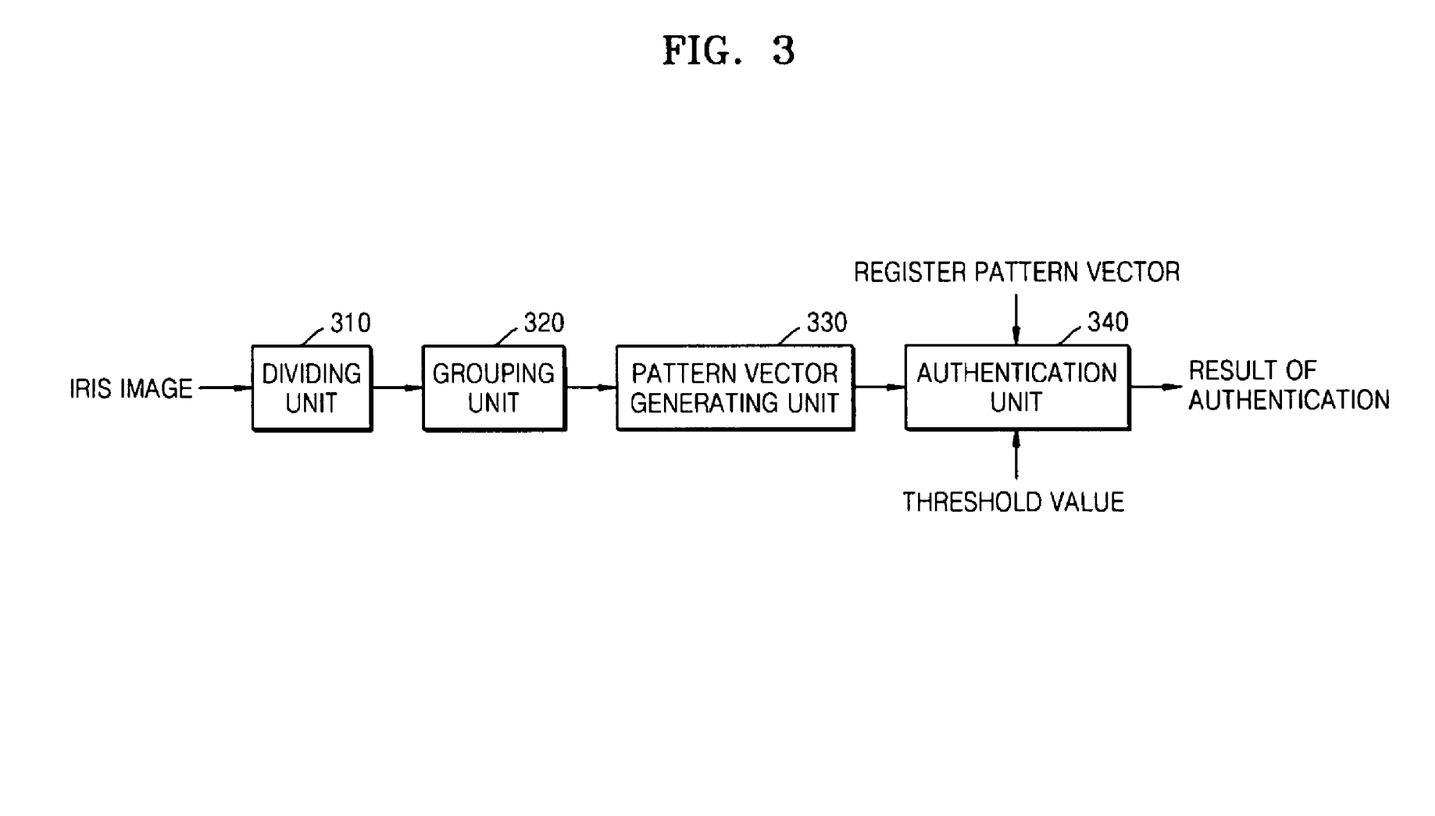
FIG. 3 is a block diagram of an apparatus for iris recognition using a cumulative sum based CPA according to an embodiment of the present invention.
Figure 4:
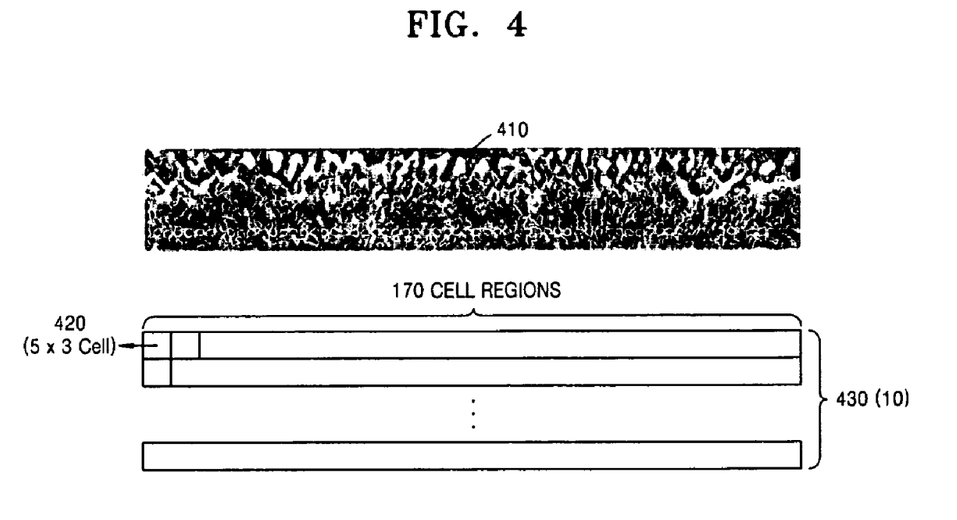
FIG. 4 is a view showing dividing of iris image into basic cell regions.
Figure 5:
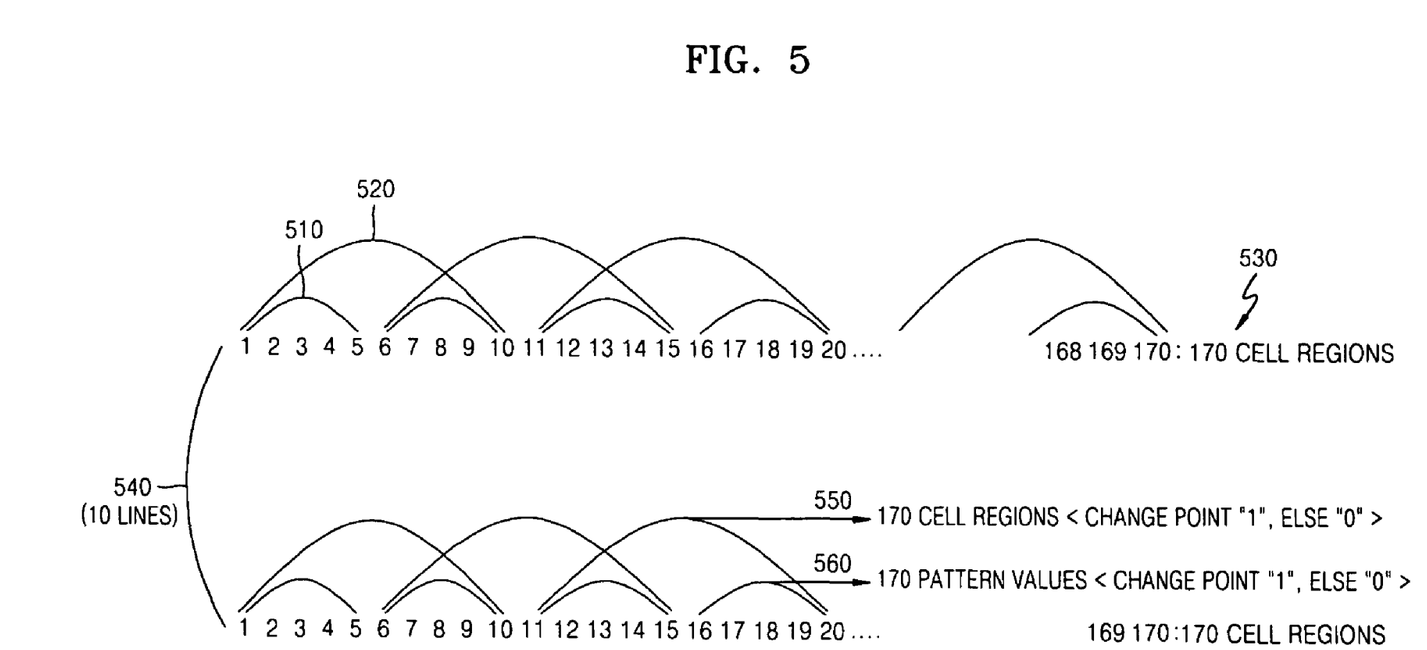
FIG. 5 is a view showing grouping of cell regions for the CPA after dividing the iris image into basic cell regions.
Figure 6A:
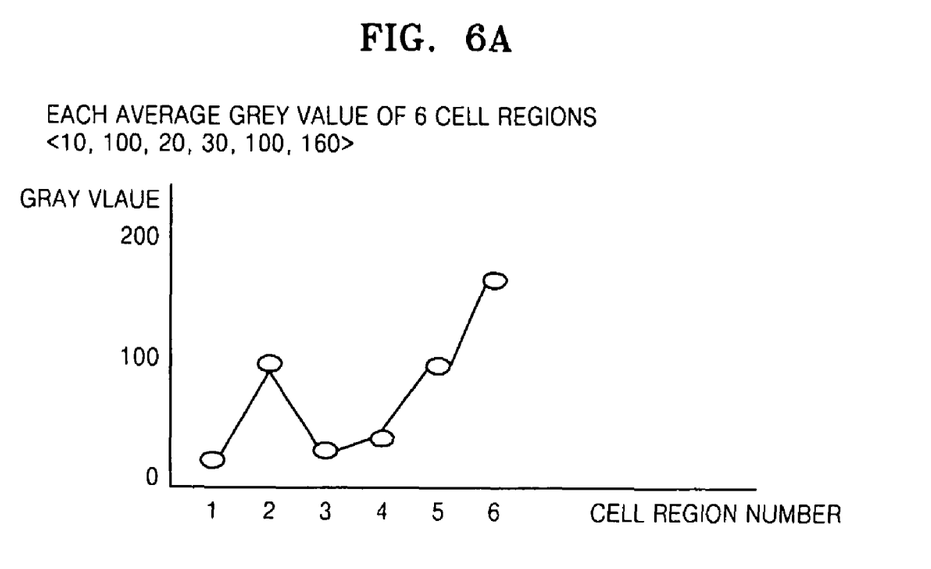
FIG. 6A is a graph showing average grey values of 6 cell regions.

A method of iris recognition using a cumulative-sum-based change point analysis (CPA) according to an embodiment of the present invention will be described with reference to FIGS. 2 through 7. FIG. 2 is a flowchart of a method of iris recognition using a cumulative sum based CPA according to an embodiment of the present invention, and FIG. 3 is a block diagram of an apparatus for iris recognition using a cumulative sum based CPA according to an embodiment of the present invention. FIG. 4 is a view showing dividing of an iris region into basic cell regions, and FIG. 5 is a view showing grouping of cell regions for the CPA after dividing the iris region into basic cell regions. FIG. 6A is a graph showing average grey values of 6 cell regions, and FIG. 6B is a graph showing results of cumulative sum based CPA based on the graph in FIG. 6A.

A dividing unit 310 transforms an iris image to polar coordinates and divides the transformed iris region into basic cell regions for the cumulative-sum-based change point analysis. That is, the image transformed to the polar coordinate of iris is divided by a cell region as a basic unit region. At first, an obtained iris image is transformed into the polar coordinated iris image for analysis. The polar coordinated iris image has a pixel size of 64×512. The characteristic patterns of iris are well shown in an autonomic nerve, and there is no need to analyze entire characteristic patterns of iris image. About 78% of iris image in vertical direction is sufficient to extract characteristic patterns of iris from the polar coordinate image 410. That is, a portion of iris image below than a dotted line is not used to extract the characteristic pattern of iris. That is, about 50 pixels in a vertical direction are used, which is calculated by 64×0.78=50 pixels. As shown in FIG. 4, the basic cell region 420 is configured of 5×3 pixels. That is, one cell region is a 5×3 pixel size, and an average grey value is used as a representative value of a basic cell region to calculate the cumulative sum. There are 170 basic cell regions included in the horizontal line of the iris image because the horizontal pixel size of iris image is 512 and the horizontal pixel size of the basic cell region is 3 (512÷3=170). There are 10 basic cell regions 430 included in the vertical line of the iris image because the vertical pixel size of the iris image is 50 and the vertical pixel size of the basic cell region is 5 (50÷5=10). Therefore, the number of basic cell regions in the iris image is 1700 which is calculated from 170×10. That is, the iris image is divided into 170 basic cell regions in operation S210.

A grouping unit 320 groups the basic cell regions into a semi local group or a local group after dividing the transformed iris image as shown in FIG. 3 into the basic cell regions, where the semi local group is described as a first group in claims and the local group is described as a second group. That is, the basic cell regions are grouped in a horizontal direction as shown in 510 and 520 of FIG. 5. As shown in 530 of FIG. 5, there are 170 cell regions in one horizontal line and there are 10 horizontal lines in the iris image. As shown in 510 of FIG. 5, cell regions 1 to 5 are grouped as a first group in operation S220. A pattern vector generating unit 330 finds a cell region that has a sharp change point by applying the cumulative sum based on a change point analysis (CPA) algorithm within this group. The pattern vector generating unit 350 also finds a sharp change point in a second group 520 using the same method. The pattern vector generating unit 350 finds the sharp change point more accurately by overlapping the groups with adjacent groups as shown in 520 of FIG. 5 in operation S230. One horizontal line 530 is divided into two groups 510 and 520. Therefore, each line creates 170 pattern vectors as like as 550 and 560 of FIG. 5. A cell region selected as the sharp charge point is set as 1, and other cell regions are set as 0 to create the pattern vectors. Therefore, the pattern vector of 3400 bits ((170+170)×10) is generated in operation S240. An authenticating unit 340 determines whether a currently inputted iris characteristics pattern is matched with registered iris characteristics patterns of authenticated person through calculating a similarity using a hamming distance between the calculated pattern vector and the registered pattern vector and using the statistical method based on a predetermined threshold value in operation S250. The pattern vector may be extracted through grouping the basic cell regions in the vertical direction as like as the pattern vector extracting in the horizontal directions.

Figure 6B:
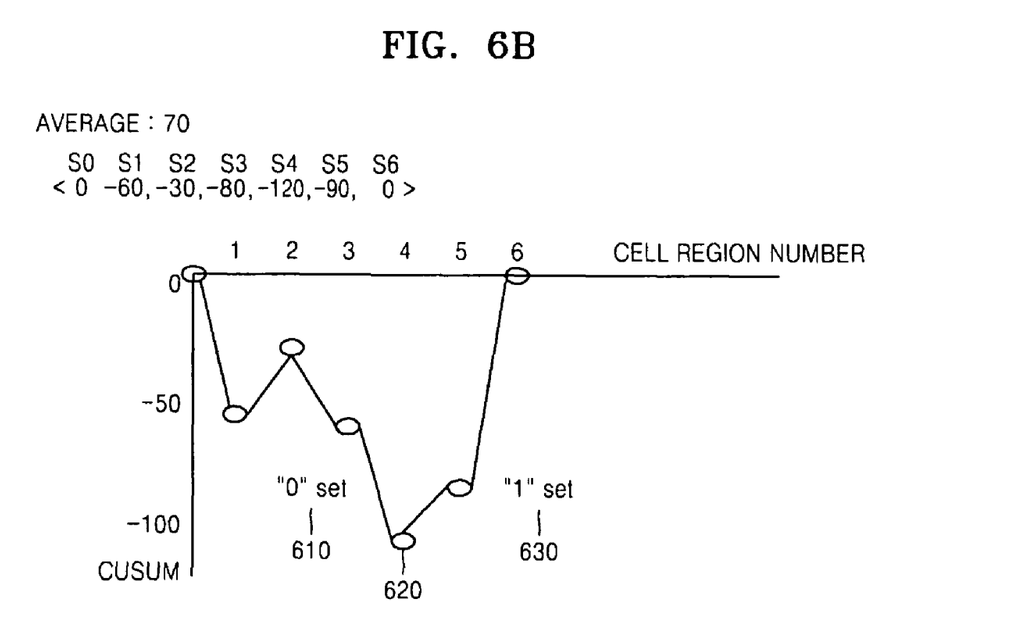
FIG. 6B is a graph showing results of cumulative sum based CPA based on the graph in FIG. 6A.

FIGS. 6A and 6B show the cumulative-sum-based change point analysis using a branch as an average grey value of cell regions. FIGS. 6A and 6B also show a method of generating a pattern vector for preventing the performance of iris recognition from being degraded according to the shift of the iris image. FIG. 6A is a graph showing grey values of 6 cell regions, and FIG. 6B is a graph obtained by calculating cumulative sums using 6 cell regions as one group. In these graphs, a change point 620 has a largest absolute value of cumulative sum S4 in the cell region. Therefore, the fourth cell region is the sharp change point. In order to prevent the performance of iris recognition from being degraded according to the iris image shift, the cell regions of left side curve from the charge point 620 which have downward slope are set as 0, and the cell regions of right side curve from the change point 620 which have upward slope are set as 1. Accordingly, the similarity of the extracted pattern vectors can be maintained much longer although the shape change point is changed according to the movement of iris image because the overlapping portion for general grey value variation is maintained much longer.

The method of iris recognition using cumulative sum based CPA according to the present invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

As described above, the method of iris recognition using cumulative sum based CPA and the apparatus using the same according to the present invention simply and effectively recognizes the iris without requiring mass amount of calculation compared to the conventional method using wavelet transforming based pattern extraction.

Also, the present invention stably recognizes the iris by generating the pattern vector using the extracted characteristic patterns of iris for preventing the performance from being degrade according to the movement of the iris image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of iris recognition using cumulative-sum-based change point analysis comprising:

transforming an iris image into a polar coordinated image;

dividing the polar coordinated image into a plurality of unit cells in which each unit cell comprises a plurality of pixels;

assigning a characteristic cell value to each corresponding unit cell;

grouping the unit cells together into a plurality of first groups comprising j numbers of first groups, wherein each first group comprises N unit cells such that both j and N are integers greater than one;

determining an avenge characteristic cell value for each $j^{th}$ group in the first groups using an averaging formula of $$\overline{X_j} = \frac{1}{N} \sum_{i=1}^{N} X_{j,i}$$

wherein $\overline{X_j}$ is the average characteristic cell value in a $j^{th}$ group in the first groups, N is the number of unit cells in each first group, and $X_{j,i}$ is the assigned characteristic cell value of an $i^{th}$ unit cell of the $j^{th}$ group in the first groups;

calculating cumulative sums corresponding to each $j^{th}$ unit cell in each $j^{th}$ group in the first groups wherein the cumulative sums are calculated using a cumulative sum formula of $S_{j,i}=S_{j,i-1}+(X_{j,i}-\overline{X_j})$, wherein $S_{j,i}$ is a cumulative sum of the $i^{th}$ unit cell in the $j^{th}$ group of the first groups, $S_{j,i-1}$ is a cumulative sum of the $(i-1)^{th}$ unit cell in the $j^{th}$ group in the first groups, $X_{j,i}$ is the characteristic cell value of $i^{th}$ unit cell in the $j^{th}$ group in the first groups, and $\overline{X_j}$ is the average characteristic cell value in a $j^{th}$ group in the first groups, such that when i=1 then $S_{j,i-1}=S_{j,0}=0$;

identifying, from within each $j^{th}$ group of the first groups, a maximum cumulative sum (MCS) from among the calculated cumulative sums to identify a corresponding MCS cell unit within each $j^{th}$ group of the first groups and to also identify a corresponding $i^{th}$ number ($i_{MCS}$) of the identified MCS cell within each $j^{th}$ group of the first groups; and generating a pattern vector having a plurality of bits corresponding to cell units associated with the first groups.

2. The method of claim 1 wherein the generating step further comprises assigning a zero value to each corresponding bit in the pattern vector when the corresponding cell unit in each $j^{th}$ group of the first groups is has an $i^{th}$ number which is less than the corresponding $i_{MCS}$ number; and assigning a one value to each corresponding bit in the pattern vector when the corresponding cell unit in each $j^{th}$ group of the first groups has an $i^{th}$ number which is equal to or greater than the $i_{MCS}$ number in each $j^{th}$ group of the first groups.

3. The method of claim 1 wherein the generating step further comprises assigning a one value to each corresponding bit in the pattern vector when the corresponding cell unit in each $j^{th}$ group of the first groups is has an $i^{th}$ number which is less than the corresponding $i_{MCS}$ number; and assigning a zero value to each corresponding bit in the pattern vector when the corresponding cell unit in each $j^{th}$ group of the first groups has an $i^{th}$ number which is equal to or greater than the $i_{MCS}$ number in each $j^{th}$ group of the first groups.

4. The method of claim 1 further comprising performing an authentication process through calculating a similarity between the generated pattern vector and a pervious registered pattern vector.

5. The method of claim 4 wherein the performing the authentication process uses a hamming distance between the generated pattern vector and the registered pattern vector.

6. The method of claim 5 wherein the performing the authentication process uses a statistical method based on a predetermined threshold value.

7. The method of claim 1 further comprising:

grouping the unit cells together into a plurality of second groups comprising k numbers of second groups, wherein each second group comprises M unit cells such that both k and M are integers greater than one;

determining an average characteristic cell value for each $k^{th}$ group in the second groups using an averaging formula of $$\overline{X_k} = \frac{1}{M} \sum_{i=1}^{M} X_{k,i}$$

wherein $\overline{X_k}$ is the average characteristic cell value in a $k^{th}$ group in the second groups, M is the number of unit cells in each second group, and $X_{k,i}$ is the assigned characteristic cell value of an $i^{th}$ unit cell of the $k^{th}$ group in the second groups;

calculating cumulative sums corresponding to each $i^{th}$ unit cell in each $k^{th}$ group in the second groups wherein the cumulative sums are calculated using a cumulative sum formula of $S_{k,i}=S_{k,i-1}+(X_{k,i}-\overline{X_k})$, wherein $S_{k,i}$ is a cumulative sum of the $i^{th}$ unit cell in the $k^{th}$ group of the second groups, $S_{k,j-1}$ is a cumulative sum of the $(i-1)^{th}$ unit cell in the $k^{th}$ group of the second groups, $X_{k,j}$ is the characteristic cell value of $j^{th}$ unit cell in the $k^{th}$ group in the second groups, and $\overline{X_k}$ is the average characteristic cell value in the $k^{th}$ group in the second groups, such that when i=1 then $S_{k,i-1}=S_{k,0}=0$;

identifying, from the calculated cumulative sums within each $k^{th}$ group of the second groups, the MCS to identify the corresponding MCS cell unit within each $k^{th}$ group of the second groups and to identify the $i_{MCS}$ of the identified MCS cell within each $k^{th}$ group of the second groups;

generating the pattern vector to also include bits corresponding to cell units associated with the second groups.

8. The method of claim 7 wherein the generating the pattern vector that also includes the second group further comprises:
   assigning a zero value to each corresponding bit in the pattern vector when the corresponding cell unit in each $k^{th}$ group of the second groups is has an $i^{th}$ number which is less than the corresponding $i_{MCS}$ number; and
   assigning a one value to each corresponding bit in the pattern vector when the corresponding cell unit in each $k^{th}$ group of the second groups has an $i^{th}$ number which is equal to or greater than the $i_{MCS}$ number in each $k^{th}$ group of the second groups.

9. The method of claim 7 wherein the generating the pattern vector that also includes the second group further comprises:
   assigning a one value to each corresponding bit in the pattern vector when the corresponding cell unit in each $k^{th}$ group of the second groups has an $i^{th}$ number which is less than the corresponding $i_{MCS}$ number; and
   assigning a zero value to each corresponding bit in the pattern vector when the corresponding cell unit in each $k^{th}$ group of the second groups has an $i^{th}$ number which is equal to or greater than the $i_{MCS}$ number in each $k^{th}$ group of the second groups.

10. The method of claim 7 wherein M is greater than N, and i is greater than j.

11. The method of claim 1 wherein the characteristic cell value to each corresponding unit cell is an average.

12. The method of claim 11 wherein the average characteristic cell value is an average grey scale characteristic cell value associated with each pixel in each corresponding unit cell.

13. The method of claim 7, wherein each second group comprises two first groups, and each second group is grouped by overlapping unit cells of adjacent second group by overlapping unit cells of adjacent second groups by as many as the number of unit cells in the first group.

14. An apparatus for iris recognition using a cumulative-sum-based change point analysis comprising:
   a dividing unit for transforming an iris image into a polar coordinated image, for dividing the polar coordinated image into a plurality of unit cells in which each unit cell comprises a plurality of pixels and for assigning a characteristic cell value to each corresponding unit cell;
   a grouping unit
      for grouping the unit cells together into a plurality of first groups comprising j numbers of first groups, wherein each first group comprises N unit cells such that both j and N are integers greater than one,
      for determining an average characteristic cell value for each $j^{th}$ group in the first groups using an averaging formula of $$\overline{X_j} = \frac{1}{N}\sum_{i=1}^{N} X_{j,i,}$$

wherein $\overline{X_j}$ is the average characteristic cell value in a $j^{th}$ group in the first groups, N is the number of unit cells in each first group, $X_{j,i}$ is the assigned characteristic cell value of an $i^{th}$ unit cell of the $j^{th}$ group in the first groups,
      for calculating cumulative sums corresponding to each $i^{th}$ unit cell in each $j^{th}$ group in the first groups wherein the cumulative sums are calculated using a cumulative sum formula of $S_{j,i}=S_{j,i-1}](X_{j,i}\cdot\overline{X_j})$, wherein $S_{j,i}$ is a cumulative sum of the $i^{th}$ unit cell in the $j^{th}$ group of the first groups, $S_{j,i-1}$ is a cumulative sum of the $(i-1)^{th}$ unit cell in the $j^{th}$ group in the first groups, $X_{j,i}$ is the characteristic cell value of $i^{th}$ unit cell in the $j^{th}$ group in the first groups, and $\overline{X_j}$ is the average characteristic cell value in a $j^{th}$ group in the first groups, such that when i=1 then $S_{j,i-1}=S_{j,0}=0$,
      for identifying, from within each $j^{th}$ group of the first groups, a maximum cumulative sum (MCS) from among the calculated cumulative sums to identity a corresponding MCS cell unit within each $j^{th}$ group of the first groups and to also identify a corresponding $i^{th}$ number ($i_{MCS}$) of the identified MCS cell within each $j^{th}$ group of the first groups;
   a pattern vector generating unit for generating a pattern vector having a plurality of bits corresponding to cell units associated with the first groups; and
   an authentication unit for calculating a similarity between the generated pattern vector and a pervious registered pattern vector.

15. The apparatus of claim 14 wherein the authentication unit performs the authentication process by using a hamming distance between the generated pattern vector and the registered pattern vector.

16. The apparatus of claim 15 wherein the performing the authentication process uses a statistical method based on a predetermined threshold value.

17. The apparatus of claim 14 wherein the grouping unit
   for grouping the unit cells together into a plurality of second groups comprising k numbers of second groups, wherein each second group comprises M unit cells such that both k and M are integers greater than one,
   for determining an average characteristic cell value for each $k^{th}$ group in the second groups using an averaging formula of $$\overline{X_k} = \frac{1}{M}\sum_{i=1}^{M} X_{k,i,}$$

wherein $\overline{X_k}$ is the average characteristic cell value in a $k^{th}$ group in the second groups, M is the number of unit cells in each second group, and $X_{k,j}$ is the assigned characteristic cell value of an $i^{th}$ unit cell of the $k^{th}$ group in the second groups,
   for calculating cumulative sums corresponding to each $i^{th}$ unit cell in each $k^{th}$ group in the second groups wherein the cumulative sums are calculated using a cumulative sum formula of $S_{k,i}=S_{k,i-1}+(X_{k,i}-\overline{X_k})$, wherein $S_{k,i}$ is a cumulative sum of the $i^{th}$ unit cell in the $k^{th}$ group of the second groups, $S_{k,j-1}$ is a cumulative sum of the $(i-1)^{th}$ unit cell in the $k^{th}$ group of the second groups, $X_{k,i}$ is the characteristic cell value of $i^{th}$ unit cell in the $k^{th}$ group in the second groups, and $\overline{X_k}$ is the average characteristic cell value in the $k^{th}$ group in the second groups, such that when i=1 then $S_{k,i-1}=S_{k,0}=0$, and
   for identifying, from the calculated cumulative sums within each $k^{th}$ group of the second groups, the MCS to identity the corresponding MCS cell unit within each $k^{th}$ group of the second groups and to identify the $i_{MCS}$ of the identified MCS cell within each $k^{th}$ group of the second groups.

18. The apparatus of claim 17 wherein the pattern vector generating unit for generating the pattern vector to also include bits corresponding to cell units associated with the second groups.

19. A non-transitory computer-readable recording medium containing computer-readable instructions for carrying out a method of iris recognition using cumulative-sum-based change point analysis, the non-transitory computer-readable recording medium comprising the instructions of:

transforming an iris image into a polar coordinated image;

dividing the polar coordinated image into a plurality of unit cells in which each unit cell comprises a plurality of pixels;

assigning a characteristic cell value to each corresponding unit cell;

grouping the unit cells together into a plurality of first groups comprising j numbers of first groups, wherein each first group comprises N unit cells such that both i and N are integers greater than one;

determining an average characteristic cell value for each $j^{th}$ group in the first groups using an averaging formula of $$\overline{X_j} = \frac{1}{N}\sum_{i=1}^{N} X_{j,i},$$

wherein $\overline{X_j}$ is the average characteristic cell value in a $j^{th}$ group in the first groups, N is the number of unit cells in each first group, and $X_{j,i}$ is the assigned characteristic cell value of an $i^{th}$ unit cell of the $j^{th}$ group in the first groups;

calculating cumulative sums corresponding to each $i^{th}$ unit cell in each $j^{th}$ group in the first groups wherein the cumulative sums are calculated using a cumulative sum formula of $S_{j,i} = S_{j,i-1} + (X_{j,i} - \overline{X_j})$, wherein $S_{j,i}$ is a cumulative sum of the $i^{th}$ unit cell in the $j^{th}$ group of the first groups, $S_{j,i-1}$ is a cumulative sum of the $(i-1)^{th}$ unit cell in the $j^{th}$ group in the first groups, $X_{j,i}$ is the characteristic cell value of $i^{th}$ unit cell in the $j^{th}$ group in the first groups, and $\overline{X_j}$ is the average characteristic cell value in a $j^{th}$ group in the first groups, such that when i=1 then $S_{j,i-1}=0$;

identifying, from within each $j^{th}$ group of the first groups, a maximum cumulative sum (MCS) from among the calculated cumulative sums to identify a corresponding MCS cell unit within each $j^{th}$ group of the first groups and to also identify a corresponding $i^{th}$ number ($i_{MCS}$) of the identified MCS cell within each $j^{th}$ group of the first groups;

generating a pattern vector having a plurality of bits corresponding to cell units associated with the first groups; and performing an authentication process through calculating a similarity between the generated pattern vector and a pervious registered pattern vector.

20. The non-transitory computer-readable recording medium of claim 19 wherein the medium is selected from the group consisting of a read-only memory (ROM), a random-access memory (RAM), a CD-ROM, a magnetic tap, a floppy disk, and an optical data storage device.

* * * * *